G. MENIER.
AUTOMATIC LUBRICATING DEVICE FOR LOCKS AND BOLTS.
APPLICATION FILED MAY 26, 1917.

1,265,351.

Patented May 7, 1918.

Gaston Menier,
Inventor
by Lamson Langes
Attorney

UNITED STATES PATENT OFFICE.

GASTON MENIER, OF PARIS, FRANCE.

AUTOMATIC LUBRICATING DEVICE FOR LOCKS AND BOLTS.

1,265,351.        Specification of Letters Patent.        Patented May 7, 1918.

Application filed May 26, 1917. Serial No. 171,208.

*To all whom it may concern:*

Be it known that I, GASTON MENIER, a citizen of the French Republic, and resident of Paris, Seine, France, have invented certain new and useful Improvements in Automatic Lubricating Devices for Locks and Bolts, of which the following is a specification.

This invention has for its object an automatic lubricating device for the essential working parts of locks and bolts, and in particular for the engaging members, latches or bolts proper; one object of the invention is to render the closing of doors very quiet and easy and to avoid damage to or shaking of the door frames and posts such as is generally caused by the resistance to sliding offered by a defective, dry or rusted bolt or latch when engaging with its catch plate.

Various different mechanical devices have been proposed in order to facilitate the sliding engagement of bolts and latches and to render it quieter, but none of these, which were generally applied to the catch plate, have replaced in effectiveness the application of a drop of oil to the bevel of the bolt or latch, this being the one part of the bolt which makes contact with the catch plate when a door is closed by simple pressure.

The lubricating device forming the subject of the present invention is so constructed that it acts directly on each closing of the door to lubricate the sliding bolt or latch; it maintains the beveled surface of this latter in a perfectly lubricated condition at all times, and in view of its mode of action the efficacy of the device is certain. Moreover the simplicity of its construction renders possible the application of the device to existing locks.

The device consists essentially of a greasy pad mounted on a light spring and situated on or in the catch plate. The bolt or latch when engaging with the catch plate presses back the spring-held pad, and the beveled edge of the bolt becomes smeared with the lubricating substance of the pad.

Various forms of construction of the device according to the invention are shown by way of example in the accompanying drawings, wherein:—

Figure 1:
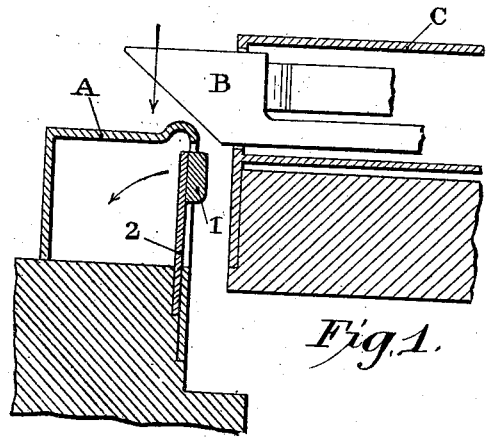
Figures 1, 2 and 3 show in different positions a lock having the catch plate thereof provided with the device in a typical form.
Figure 2:
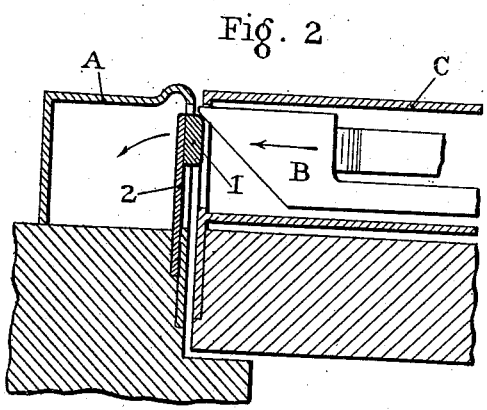
Figure 3:
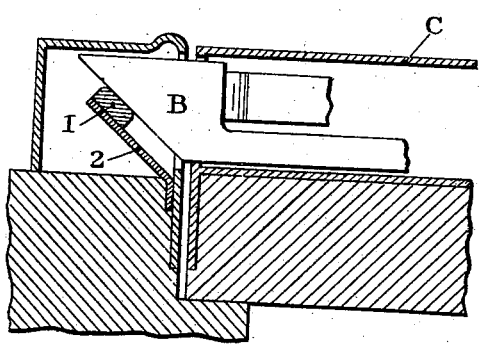

Referring first to Figs. 1 to 3, it will be seen that the catch plate A has a pad 1 at the opening proper for engagement by the sliding bolt B of the lock C; the pad 1 is of any suitable material such as felt or cloth saturated with a suitable lubricating substance which will not be affected by the atmosphere and will preserve its lubricating property for a long time. This pad is fixed by any convenient means at the end of a metal strip 2 serving as a spring, and supported inside the catch plate in any convenient manner.

When the door is open the greasy pad 1 stands in the position of Fig. 1 under the action of its spring 2. When the door is pushed to close it the beveled bolt B comes against the pad 1 as in Fig. 2, pushing it back while being wiped and lubricated on its beveled face, until the position of Fig. 3 is reached.

It will be seen from the above that the lubricating of the bolt or latch is effected at each closing of the door, and that as no oxidation of the engaging surface can possibly take place under these conditions, there can be no appreciable resistance to the sliding of the beveled face of the bolt over the catch plate so that the closing can be effected without any shock or disturbance.

Figure 4:
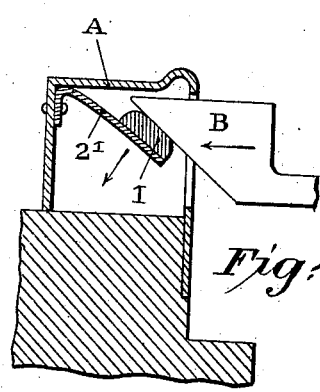
Figs. 4, 5 and 6 show modifications of this arrangement.
Figure 5:
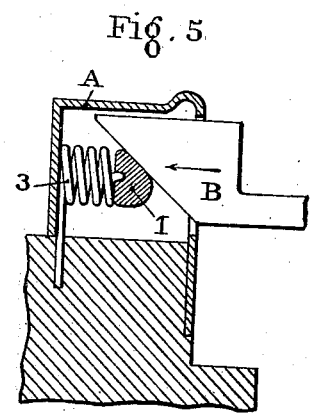
Figure 6:
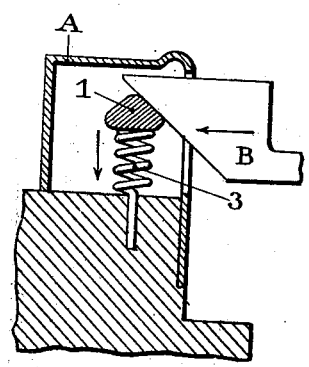

The spring which carries the greasy pad 1, instead of acting like a shutter blocking the entrance to the slot of the catch plate as in Fig. 1, and protecting this latter against any undesired entrance of foreign bodies, may be located at the base of the catch plate as in Fig. 4 while acting in a similar manner. It may also be a coiled spring 3 arranged and fixed in any convenient manner inside the catch plate as in Figs. 5 and 6.

The spring-held greasy pad may also be combined with a support for the same in order to form a device which will fit in the catch plate and will be held there by simple pressure, adhesion or gripping engagement.

An arrangement embodying a spring-held or elastic greasy pad may also be provided for lubricating purposes in the engaging slot of a dormant or positively operated bolt, or of any other sliding, locking, or bolting appliance of any kind such as is used in connection with doors.

Having thus described my invention what I claim as new and desire to secure by Letters Patent is:—

1. The combination with a lock having a beveled bolt, of a catch plate therefor having a face over which the beveled face of the bolt is adapted to slide when coming into engagement, a pad of material adapted to carry lubricant, and a springy support therefor mounted in the catch plate and adapted to hold said pad in the aperture behind the engaging face of said catch plate in such a position that the pad must always be pressed back by the inclined face of the bolt when moving forward to engage behind the catch plate, whereby said pad is caused to wipe over the face of the bolt each time that the bolt engages in the aperture of the catch plate.

2. The combination with a lock having a beveled bolt, and a catch plate therefor having a face over which the bolt is adapted to slide when coming into engagement, of a pad of material adapted to carry lubricant, and a spring support therefor mounted in the catch plate in such a position as to form an obturating shutter for the catch plate so long as the bolt of the lock is not engaging with the catch plate, said pad being adapted to be pressed back by the beveled face of the bolt in entering into engagement behind the catch plate, and to wipe over the said face of the bolt while being pressed back thereby into the aperture of the catch plate.

GASTON MENIER.

Copies of this patent may be obtained for five cents each, by addressing the "Commissioner of Patents, Washington, D. C."